(12) United States Patent
Burchfield et al.

(10) Patent No.: US 8,990,387 B2
(45) Date of Patent: Mar. 24, 2015

(54) AUTOMATIC COMPLETENESS CHECKS OF NETWORK DEVICE INFRASTRUCTURE CONFIGURATIONS DURING ENTERPRISE INFORMATION TECHNOLOGY TRANSFORMATION

(75) Inventors: Nancy Burchfield, Dana Point, CA (US); Nathaniel Hang, Ladera Ranch, CA (US); Rafah A. Hosn, New York, NY (US); James Murray, Durham, NC (US); Harigovind V. Ramasamy, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 13/618,342

(22) Filed: Sep. 14, 2012

(65) Prior Publication Data

US 2014/0068057 A1 Mar. 6, 2014

Related U.S. Application Data

(63) Continuation of application No. 13/600,896, filed on Aug. 31, 2012, now abandoned.

(51) Int. Cl.
*G06F 15/173* (2006.01)
*H04L 29/06* (2006.01)

(52) U.S. Cl.
CPC .................................... *H04L 63/02* (2013.01)
USPC ............. 709/224; 700/220; 700/250; 726/11; 726/12

(58) Field of Classification Search
CPC ............................ H04L 63/02; G06F 11/3051
USPC .................... 709/220–224, 245–246, 250; 726/11–12
See application file for complete search history.

(56) References Cited

U.S. PATENT DOCUMENTS

| | | | |
|---|---|---|---|
| 7,031,311 B2 * | 4/2006 | MeLampy et al. | 370/392 |
| 7,546,139 B2 * | 6/2009 | Money et al. | 455/550.1 |
| 8,135,815 B2 * | 3/2012 | Mayer | 709/223 |
| 8,756,515 B2 * | 6/2014 | Jayadevan et al. | 715/763 |
| 2007/0022164 A1 * | 1/2007 | Nog et al. | 709/206 |
| 2009/0052435 A1 | 2/2009 | Nakamura et al. | |
| 2009/0198707 A1 * | 8/2009 | Rohner | 707/100 |
| 2009/0274089 A1 * | 11/2009 | Money et al. | 370/316 |
| 2012/0271927 A1 * | 10/2012 | Shakirzyanov et al. | 709/220 |
| 2013/0132553 A1 * | 5/2013 | Stratton et al. | 709/223 |

OTHER PUBLICATIONS

Al-Shaer, Conflict Classification and Analysis of Distribution Firewall Policies, vol. 23, No. 10, Oct. 2005.

(Continued)

*Primary Examiner* — Bharat N Barot
(74) *Attorney, Agent, or Firm* — Ryan, Mason & Lewis, LLP

(57) ABSTRACT

A system and an article of manufacture for automatically determining configuration completeness during information technology (IT) transformation from a pre-transformation source environment to a post-transformation target environment include obtaining a record of each of multiple data flows in a source environment, transforming each data flow in the source environment to a transformed data flow that corresponds to a target environment, and automatically determining that each of the transformed data flows is covered by a firewall configuration of one or more interfaces in the target environment.

17 Claims, 3 Drawing Sheets

(56) References Cited

OTHER PUBLICATIONS

Abassi et al., A Model for Specification and Validation of Security Policies in Communication Networks: The Firewall Case, 2008.
Abassi et al., Towards an Automated Firewall Security Policies Validation Process, 2008.
Adel et al., Policy Segmentation for Intelligent Firewall Testing, 2005.
Al-Haj et al., Measuring Firewall Security, 2011.
Al-Shaer et al., Conflict Classification and Analysis of Distributed Firewall Policies, 2005.
Al-Shaer et al., Firewall Policy Advisor for Anomaly Discovery and Rule Editing, 2003.
Al-Shaer et al., Management and Translation of Filtering Security Policies, 2003.
Al-Shaer et al., Discovery of Policy Anomalies in Distributed Firewalls, 2004.
Al-Shaer et al., Modeling and Management of Firewall Policies, 2004.
Youssef et al., Systematic Deployment of Network Security Policy in Centralized and Distributed Firewalls, 2011.
El-Atawy et al., An Automated Framework for Validating Firewall Policy Enforcement, 2007.
Golnabi et al., Analysis of Firewall Policy Rules Using Data Mining Technique, 2006.
Named et al. Taxonomy of Conflicts in Network Security Policies, 2006.
Hassan, Algorithms for Verifying Firewall and Router Access Lists, 2003.
Hassan et al., A Framework for Translating a High Level Security Policy Into Low Level Security Mechanisms, 2009.
Kotenko et al., Verification of Security Policy Filtering Rules by Model Checking, 2011.
Liu et al., Firewall Policy Queries, 2009.
Mayer et al., Fang: a Firewall Analysis Engine, 2000.
Rahman et al., A Declarative Approach for Global Network Security Configuration Verification and Evaluation, 2011.
Salah et al., A Probing Technique for Discovering Last-Matching Rules of a Network Firewall, 2008.
Yi et al., Inconsistency Detection System for Security Policy and Firewall Policy, 2010.
Yiwen et al., Verify Consistency Between Security Policy and Firewall Policy with Answer Set Programming, 2008.

\* cited by examiner

AUTOMATIC COMPLETENESS CHECKS OF NETWORK DEVICE INFRASTRUCTURE CONFIGURATIONS DURING ENTERPRISE INFORMATION TECHNOLOGY TRANSFORMATION

CROSS-REFERENCE TO RELATED APPLICATIONS

This application is a continuation of U.S. patent application Ser. No. 13/600,896, filed Aug. 31, 2012, and incorporated by reference herein.

FIELD OF THE INVENTION

Embodiments of the invention generally relate to computer systems, and computer system service technologies, information technology (IT), and, more particularly, to IT transformation tasks.

BACKGROUND

Migration, consolidation, virtualization, data center relocation, and cloudification are examples of large-scale coordinated changes to an organization's information technology (IT) infrastructure. These changes may pertain to servers, services, or applications. As used herein, those and the like tasks are collectively referred to as "IT transformation." Also, the original IT infrastructure is referred to herein as the source infrastructure or source environment, and the new IT infrastructure is referred to as the target infrastructure or target environment. The source and target IT infrastructures may be physical or virtual, may include the same or different server/device platforms, and may be located in a traditional data center, server rack, or even the cloud. During many such activities, a requirement is that components that were able to communicate in the source environment should also be able to do so in the target environment. For example, it may be required that a set of clients that were previously able to communicate with a server in the source environment should also be able to the same with the migrated server in the target environment.

Some transformation activities may also involve optimization of security and communications. In such scenarios, some communications that were allowed in the source environment may be identified as security holes that need to be eliminated, or no longer necessary in the target environment. Likewise, new applications may be introduced in the target environment, and, as a result, new communications that were not prevalent in the source environment may need to be introduced in the target environment.

Accordingly, in IT transformation activities, the network device infrastructure (which includes routers, firewalls, switches, etc.) may need to be configured such that communication patterns (plus or minus some patterns) in the source environment are represented in the target environment. After the setup of the configurations of the network device infrastructure, checks are performed to ensure that communication patterns that need to be permitted are indeed permitted. Similarly, checks are performed to ensure that communication patterns that need to be blocked are indeed blocked.

In existing approaches, such checks are performed in a manual, ad-hoc, and passive fashion. A commonly used approach involves a trial period after migration and setup of the network device infrastructure in the target environment, but before switching the target environment to production mode. During this trial period (which can last, for example, a few months), migration engineers and/or network administrators wait to hear any complaints from trial users that a certain application is not reachable or not functioning as it was previously. Upon hearing such complaints, the engineers and/or administrators start a manual and time-consuming process of fixing the reported problem. This produces several challenges because it may not be clear which device configuration needs to be updated to fix the problem. Additionally, once the problem is presumed fixed, the trial period may have to be extended, further resulting in costly delays.

SUMMARY

In one aspect of the present invention, techniques for automatic completeness checks of network device infrastructure configurations during enterprise IT transformation are provided. An exemplary computer-implemented method for automatically determining configuration completeness during information technology (IT) transformation from a pre-transformation source environment to a post-transformation target environment can include steps of obtaining a record of each of multiple data flows in a source environment, transforming each data flow in the source environment to a transformed data flow that corresponds to a target environment, and automatically determining that each of the transformed data flows is covered by a firewall configuration of one or more interfaces in the target environment.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps.

Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes automating completeness checks of network device infrastructure configurations during IT transformation. In contrast to the deploy-and-observe strategy of disadvantageous existing approaches, at least one embodiment of the invention enables a proactive check of the completeness of network device configurations, even prior to their actual implementation or deployment.

Accordingly, as detailed herein, at least one embodiment of the invention includes obtaining a log or report of flows that were observed to be accepted or denied in a source environment. Additionally, flow transformation can include the following steps. A mapping function can be applied to convert the parameters in the observed flows into values that are relevant in the target environment. A reduction function can be applied to eliminate flows that were accepted in the source environment but need to be denied in the target environment. Additionally, an enhancement function can be applied to allow flows that were denied in the source environment but need to be permitted in the target environment.

The transformed flows are divided into sets, with each set relevant to one interface of a network device in the target environment. Further, for each set, at least one embodiment of the invention includes utilizing a firewall simulator tool to check whether the transformed flows are covered by the target interface configuration. Also, at least one embodiment of the invention can include generating a completeness report along with recommendations.

Figure 1:
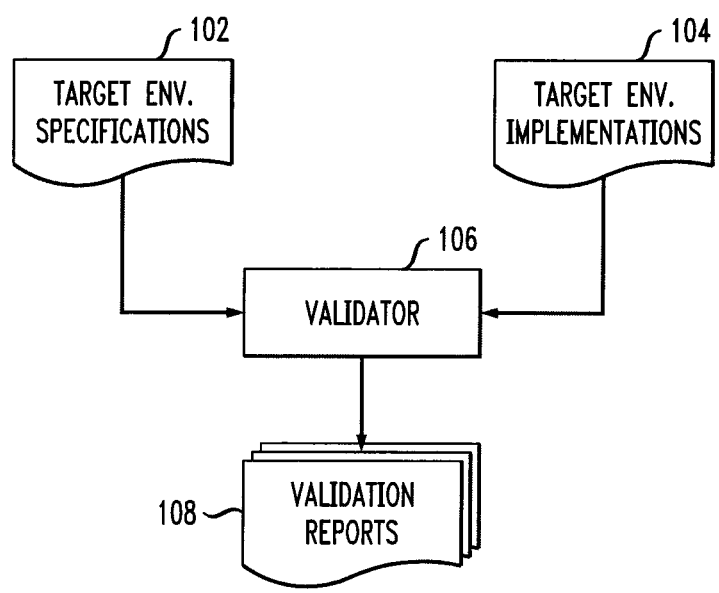
FIG. 1 is a diagram illustrating an overview of checking completeness of target firewall configurations, according to an embodiment of the invention.

FIG. 1 is a diagram illustrating an overview of checking completeness of target firewall configurations, according to an embodiment of the invention. By way of illustration, FIG. 1 depicts target environment specifications 102 and target environment implementations 104, which are provided to a validator component 106. Target environment specifications may take the form of flow control requirements for the target environment (for example, see required per-interface communication patterns 232 depicted in FIG. 2). Target environment implementations may take the form of rules used for configuring firewall interfaces in the target environment (for example, see per-interface firewall rules 202 depicted in FIG. 2). Additionally, the validator component 106 generates validation reports 108.

Figure 2:
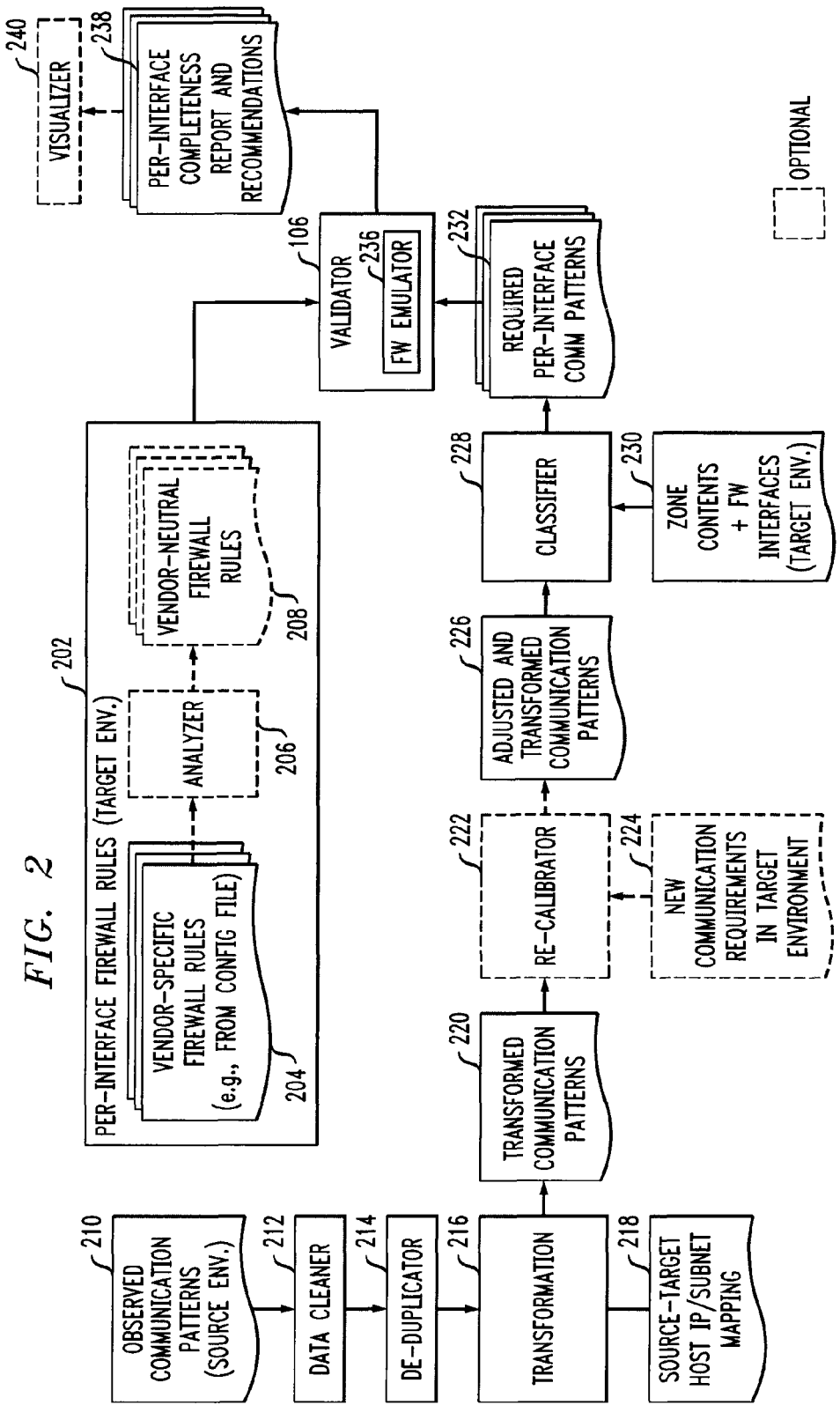
FIG. 2 is a diagram illustrating example architecture for checking completeness of target firewall configurations, according to an embodiment of the present invention.

FIG. 2 is a diagram illustrating example architecture for checking completeness of target firewall configurations, according to an embodiment of the present invention. By way of illustration, FIG. 2 depicts observed communications patterns 210 (from the source environment), which are provided to a data cleaner component 212, a de-duplicator component 214, and ultimately to a transformation component 216 which receives a source-target mapping 218. The data cleaner component 212 categorizes source environment communication patterns into one of two categories: (1) patterns that have insufficient or invalid information, which are discarded and may require manual inspection, and (2) the remaining patterns, which are passed on for further processing to generate elementary rules. The de-duplicator component 214 is an optional component and removes duplicate communication patterns for improved efficiency in later processing stages. The transformation component 216 generates transformed communication patterns 220, which can be forwarded to a re-calibrator component 222 (which can receive input in the form of new communication requirements 224 in the target environment).

If source-target host/IP subnet mapping information 218 is empty or not provided, the transformed communication patterns will be the same as the input provided to the transformation component 216. As explained herein, the source-target host/IP subnet mapping information 218 describes how an internet protocol (IP) address that occurs in the communication pattern(s) changes as a result of the IT transformation activity. For example, the source-target mapping may specify that the IP address of an ssh server changes from 192.168.254.200 to 10.20.6.11 as a result of the IT transformation.

Additionally, the new communication requirements 224 may be of two types:
- Communication patterns previously present in the source environment, but that should be avoided in the target environment. Suppose, for example, that communication to a web server from a certain client was allowed previously, but in the data center to which the web server is being migrated, that client should not be allowed to connect to the web server.
- Communication patterns that were not previously present in the source environment, but should be allowed in the target environment. Suppose, for example, that a new service (that was absent in the source environment) is going to be deployed at port 50505 at a server that is being migrated to the target environment. Consequently, this new communication pattern should be taken into account when generating elementary rules.

The re-calibrator component 222 can generate adjusted and transformed communication patterns 226, which are provided to a classifier component 228 (which receives zone contents and firewall interfaces 230 from the target environment), which ultimately outputs required per-interface communication patterns 232. Communication patterns 232 are provided to the validator component 106, which includes a firewall emulator component 236. The validator component 106 receives additional input from a per-interface firewall rules (of the target environment) component 202, and ultimately generates per-interface completeness reports and recommendations 238, which can be sent to a visualizer component 240.

As also depicted in FIG. 2, the per-interface firewall rules (of the target environment) component 202 includes vendor-specific firewall rules 204 (for example, from a configuration file) which can be provided to an analyzer component 206, ultimately producing vendor-neutral firewall rules 208. A vendor-neutral firewall rule contains all of the attributes and associated values necessary for configuring flow-control rules on a firewall device; however, such a rule is not specific to one particular vendor. A vendor-neutral firewall rule may be likened to pseudo code, and vendor-specific firewall rules to machine-level code.

At least one embodiment of the invention can be implemented in connection with enterprise firewalls, but the techniques can also be extended to other kinds of network devices (routers, switches, other types of firewalls, etc.), and those devices can be either physical or virtual.

The techniques detailed herein include comparing the firewall configurations (to be implemented or already implemented) in a target environment against communication patterns observed in a source environment (also referred to herein as source communication patterns). Also, as used herein, the term "communication pattern" refers to a communication that is either permitted or denied. At least one embodiment of the invention includes communication patterns that reflect what is required in the target environment. Such embodiments include a transformation stage, which includes mapping, reduction, and enhancement steps.

Knowledge about communication patterns in the source environment may be obtained by a variety of means, such as performing analysis of firewall configuration files associated with the source environment, observing run-time network flow at the source environment, analyzing configured dependencies at one or more servers running on the source environment, analyzing firewall log files, or combinations thereof. The communication patterns are typically expressed using attributes such as source IP address, source subnet, destination IP address, destination subnet, protocol (for example, transmission control protocol (TCP), user datagram protocol (UDP), etc.), action to be taken (that is, accept packet or deny packet), port number(s), traffic direction (incoming or outgoing or both), or combinations thereof. For example, a run-time network flow at the source environment may be obtained by running the netstat tool available on many common platforms. As a specific example, the netstat tool run on a host with IP address 192.168.254.200 may reveal the following communication pattern, where there is a connection between 192.168.254.200 at port 22 (ssh) and 64.73.135.198 at port 19583; that is, 192.168.254.200 is likely a ssh server.

The mapping step includes taking a source-to-target mapping function as input, and converting the parameters (for example, internet protocol (IP) addresses and hostnames) in the source communication patterns into values that are relevant in the target environment. The reduction step includes taking two inputs: the output of the map step and a list of communication patterns that need to eliminated in the target environment. The result is a list of mapped communication patterns, all of which are permissible in the target environment. Further, the enhancement step includes taking two inputs: the output of the reduction step and a list of communication patterns that were absent between corresponding devices in the source environment but need to be present in the target environment. The result is a list of mapped communication patterns, all of which are permissible in the target environment.

Following the transformation stage (depicted in connection with component 216 in FIG. 2), there is a classification stage, which includes partitioning the transformed communication patterns into sets, and wherein each set is relevant to one interface of a network device in the target environment. For this purpose, at least one embodiment of the invention includes the use of classifier component 228, which takes as input the transformed communication patterns along with zone contents and firewall interfaces for the target environment 230. The zone contents and firewall interfaces for the target environment 230 provides the security zone structure of the target environment, that is, which subnets belong to which security zone, where there are at least two firewall interfaces separating every pair of zones, etc.

As described herein, firewall configurations are implemented on a per-interface basis; that is, each interface of a firewall in the target environment is configured with a set of access control rules that specify what type of communication to allow and what type of communication to deny. Therefore, in at least one embodiment of the invention includes a comparison on a per-interface basis, that is, configurations for a firewall interface in the target environment are compared against transformed communication patterns as applicable to that interface.

The comparison is performed using the firewall emulator component 236, which emulates the performance of a real firewall device. By way of example, assume that one of the firewalls in a target environment has two interfaces, interface A and interface B. In order to perform the emulation, the emulator component 236 is "configured" or initialized with rules corresponding to each of the firewall interfaces A and B. The emulator 236 goes through the list of transformed communication patterns for interface A, and checks whether each pattern is covered by the rules for A. The emulator component 236 does the same for interface B. As used herein, a transformed communication pattern (classified as) relevant for a particular firewall interface is covered by a firewall rule at that interface if and only if:

The specified action to be taken (accept or deny) is the same for both the communication pattern and the firewall rule; and In case of an accept action, the set of all packets accepted by the communication pattern is a subset of the set of all packets accepted by the firewall rule; and In case of a deny action, the set of all packets denied by the communication pattern is a subset of the set of all packets denied by the firewall rule.

As an example, consider the following subset of transformed communication patterns (classified as) relevant for the firewall interface 10.20.6.1 (Table I):

| PROTOCOL | SOURCE_IP | SOURCE_PORT | DEST_IP | DEST_PORT | DIRECTION | ACTION |
| --- | --- | --- | --- | --- | --- | --- |
| TCP | 10.20.6.11 | 22 | 10.20.81.87 | 50022 | OUTGOING | ACCEPT |
| TCP | 10.20.6.11 | 22 | 192.251.125.40 | 22880 | OUTGOING | ACCEPT |
| TCP | 10.20.6.11 | 22 | 192.251.125.40 | 51950 | OUTGOING | ACCEPT |
| TCP | 10.20.6.11 | 22 | 192.251.125.40 | 54532 | OUTGOING | ACCEPT |
| TCP | 10.20.6.11 | 22 | 192.251.125.40 | 28193 | OUTGOING | ACCEPT |
| TCP | 10.20.6.11 | 22 | 192.251.125.40 | 43561 | OUTGOING | ACCEPT |
| TCP | 10.20.6.11 | 22 | 192.251.125.40 | 53955 | OUTGOING | ACCEPT |
| TCP | 10.20.6.11 | 22 | 64.73.135.198 | 38711 | OUTGOING | ACCEPT |
| TCP | 10.20.6.11 | 22 | 64.73.135.198 | 19583 | OUTGOING | ACCEPT |
| TCP | 10.20.6.11 | 22 | 64.73.135.198 | 25571 | OUTGOING | ACCEPT |
| TCP | 10.20.6.11 | 22 | 64.73.135.198 | 38727 | OUTGOING | ACCEPT |
| TCP | 10.20.6.11 | 22 | 64.73.135.198 | 25553 | OUTGOING | ACCEPT |
| TCP | 10.20.6.11 | 22 | 64.73.135.198 | 38654 | OUTGOING | ACCEPT |
| TCP | 10.20.6.11 | 22 | 64.73.135.198 | 38733 | OUTGOING | ACCEPT |
| TCP | 10.20.6.11 | 22 | 64.73.135.198 | 25565 | OUTGOING | ACCEPT |
| TCP | 10.20.6.11 | 22 | 64.73.135.198 | 25580 | OUTGOING | ACCEPT |
| TCP | 10.20.6.11 | 22 | 64.73.135.198 | 25551 | OUTGOING | ACCEPT |
| TCP | 10.20.6.11 | 22 | 64.73.135.198 | 38652 | OUTGOING | ACCEPT |

An example set of vendor-neutral firewall rules that can cover the above subset of transformed communication patterns can include (Table II):

| FW_INTERFACE_IP | SOURCE_ADDRESS | SOURCE_SUBNET_MASK | DEST_ADDRESS | DEST_SUBNET_MASK |
|---|---|---|---|---|
| 10.20.6.1 | 10.20.81.87 | 255.255.255.255 | 10.20.6.11 | 255.255.255.255 |
| 10.20.6.1 | 192.251.125.40 | 255.255.255.255 | 10.20.6.11 | 255.255.255.255 |
| 10.20.6.1 | 64.73.135.198 | 255.255.255.255 | 10.20.6.11 | 255.255.255.255 |

| FW_INTERFACE_IP | PROTOCOL | DEST_PORT | ACTION | FLOW_DIRECTION | SOURCE_PORT |
|---|---|---|---|---|---|
| 10.20.6.1 | TCP | 22 | accept | IN | ANY |
| 10.20.6.1 | TCP | 22 | accept | IN | ANY |
| 10.20.6.1 | TCP | 22 | accept | IN | ANY |

Another example set of vendor-neutral firewall rules that can cover the above subset of transformed communication patterns can include (Table III):

| FW_INTERFACE_IP | SOURCE_ADDRESS | SOURCE_SUBNET_MASK | DEST_ADDRESS | DEST_SUBNET_MASK |
|---|---|---|---|---|
| 10.20.6.1 | ANY | ANY | 10.20.6.11 | 255.255.255.255 |

| FW_INTERFACE_IP | PROTOCOL | DEST_PORT | ACTION | FLOW_DIRECTION | SOURCE_PORT |
|---|---|---|---|---|---|
| 10.20.6.1 | TCP | 22 | accept | IN | ANY |

Additionally, if there is no transformed communication pattern that a rule covers during emulation, then the rule is deemed an unnecessary rule. Unnecessary rules can be safely removed without adversely affecting flows that need to be allowed and/or denied in the target environment. Further, if there is at least one transformed communication pattern that a rule covers during emulation, then the rule is deemed a necessary-and-present rule. Additionally, if there is no rule that covers a transformed communication pattern during emulation, then the validator creates a rule that covers the pattern and labels such a rule as a necessary-but-absent rule. Necessary-but-absent rules need to be added to the firewall configurations; otherwise, flows that need to be allowed (or denied) in the target environment may be denied (or allowed).

A set of rules configured at a particular firewall interface is said to be complete with respect to a set of transformed communication patterns (classified as) relevant for that interface if and only if the validator determines that:
 All rules in that set are necessary-and-present; and
 No rules in that set are unnecessary; and
 No additional rules are deemed as necessary-but-absent.

As noted above, a communication pattern may refer to communication that is to be permitted or denied. A permitted communication pattern belonging to an interface is covered if a packet belonging to the pattern will pass through the firewall based on the rules used to configure that interface. Similarly, a denied communication pattern belonging to an interface is covered if a packet belonging to the pattern will not pass through the firewall based on the rules used to configure that interface. Based on the coverage checks, the emulator component 236 generates (on a per-interface basis) a completeness report 238 that indicates which of the transformed communication patterns are covered and which are not covered. For example, the completeness report may contain, for each firewall interface, a list of unnecessary rules, necessary-and-present rules, and necessary-but-absent rules. Based on the patterns that are not covered, recommendations for reconfiguring the firewall interface may be provided.

Figure 3:
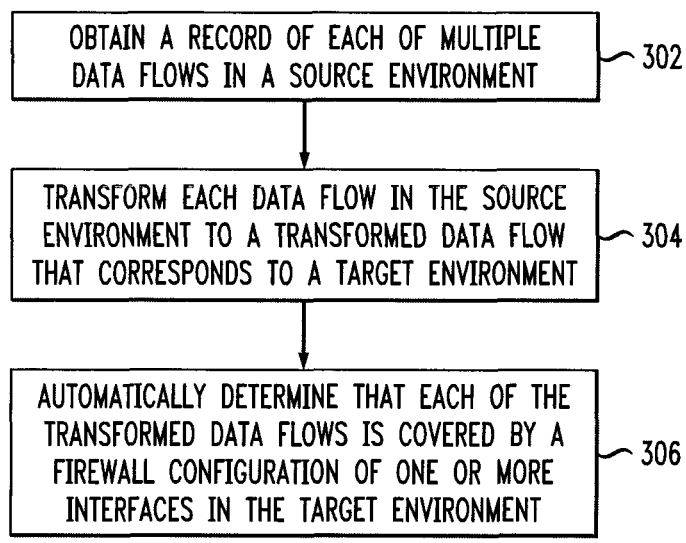
FIG. 3 is a flow diagram illustrating techniques for automatically determining configuration completeness during IT transformation from a pre-transformation source environment to a post-transformation target environment, according to an embodiment of the invention.

FIG. 3 is a flow diagram illustrating techniques for automatically determining configuration completeness during IT transformation from a pre-transformation source environment to a post-transformation target environment, according to an embodiment of the present invention. Step 302 includes obtaining a record of each of multiple data flows in a source environment. As detailed herein, the record can include a log and/or a report of flows in the source environment. Also, obtaining a record of each of multiple data flows in a source environment can include obtaining a record of each data flow that was observed to be accepted or denied in the source environment.

Step 304 includes transforming each data flow in the source environment to a transformed data flow that corresponds to a target environment. The transforming step can include applying a mapping function to convert one or more parameters in the each of multiple data flows in a source environment into corresponding values that are relevant in the target environment. Additionally, the transforming step can also include applying a reduction function to eliminate a flow that was accepted in the source environment but is to be denied in the target environment. Further, transforming step can include applying an enhancement function to allow a flow that was denied in the source environment but is to be permitted in the target environment.

Step 306 includes automatically determining that each of the transformed data flows is covered by a firewall configuration of one or more interfaces in the target environment. The step of automatically determining that each of the transformed data flows is covered by a firewall configuration can include utilizing a firewall emulator tool. A firewall emulator tool can be configured with each of one or more rules corresponding to each firewall interface in the target environment. Additionally, the firewall emulator tool determines whether each transformed data flow is covered by the one or more rules for each firewall interface in the target environment.

The techniques depicted in FIG. 3 can also include dividing the transformed data flows into one or more sets, wherein each set corresponds to one interface of a network device in the target environment. There may be overlapping elements among the sets. Additionally, at least one embodiment of the invention includes using a classifier component on input of the transformed data flows and a zone inventory for the target environment. Zone contents and firewall interfaces (for the target environment) information includes information about a list of firewall interfaces in the target environment, corresponding interne protocol addresses, the security zone structure of the target environment, that is, which subnets belong to which security zone, where there are at least two firewall interfaces separating every pair of zones, etc.

Further, at least one embodiment of the invention includes generating a completeness report that indicates which of the transformed data flows are covered by a firewall configuration of one or more interfaces in the target environment and which of the transformed data flows are not covered by a firewall configuration of one or more interfaces in the target environment. Additionally, at least one embodiment of the invention can include generating one or more recommendations for reconfiguring a firewall interface in the target environment so as to satisfy completeness.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
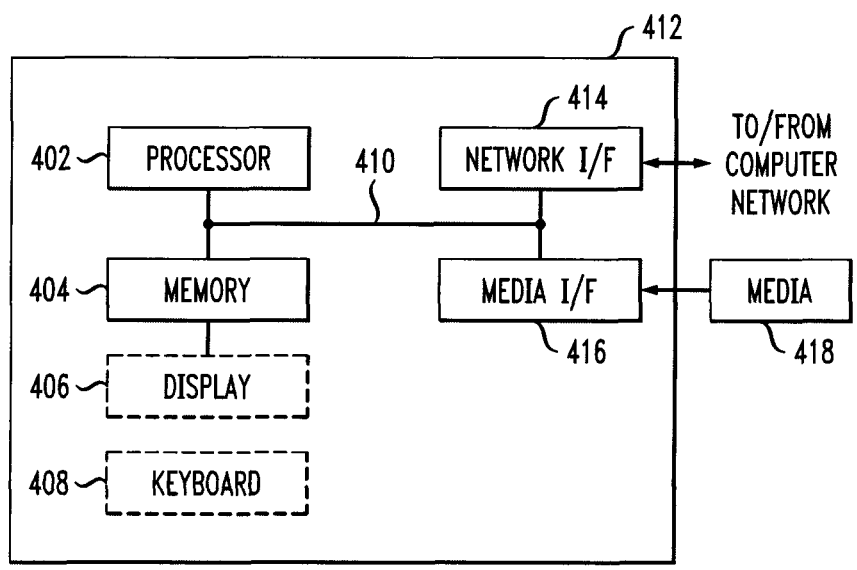
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically accomplishing validation checks that not only detect violations and/or inconsistencies but also the extent to which source polices have been successfully implemented in a target environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An article of manufacture comprising a computer readable storage medium having computer readable instructions tangibly embodied thereon which, when implemented, cause a computer to carry out a plurality of method steps comprising:
    obtaining a record of each of multiple data flows from a source environment;
    transforming each of the multiple data flows in the source environment to multiple transformed data flows that correspond to a target environment, wherein said transforming comprises applying a mapping function to convert one or more parameters in each of the multiple data flows in the source environment into corresponding values that are relevant in the target environment;
    eliminating one or more of the multiple transformed data flows that are (i) accepted in the source environment and (ii) denied in the target environment to generate an intermediate collection of transformed data flows;
    adding one or more identified data flows to the intermediate collection of transformed data flows that are (i) denied in the source environment and (ii) permitted in the target environment to generate an enhanced collection of transformed data flows; and
    automatically determining that each of the transformed data flows in the enhanced collection of transformed data flows is covered by a firewall configuration of one or more interfaces in the target environment;
    wherein at least one of the steps is carried out by a computer device.

2. The article of manufacture of claim 1, wherein said record comprises a log and/or a report of flows in the source environment.

3. The article of manufacture of claim 1, wherein said obtaining a record of each of multiple data flows in a source environment comprises obtaining a record of each data flow that was observed to be accepted or denied in the source environment.

4. The article of manufacture of claim 1, wherein the method steps comprise dividing the transformed data flows into one or more sets, wherein each set corresponds to one interface of a network device in the target environment.

5. The article of manufacture of claim 4, wherein the method steps comprise using a classifier component on input of the transformed data flows and a zone inventory for the target environment, wherein the zone inventory includes information about a list of firewall interfaces in the target environment, corresponding internet protocol addresses, and the security zone structure of the target environment.

6. The article of manufacture of claim 1, wherein said automatically determining comprises utilizing a firewall emulator tool, wherein said firewall emulator tool is configured with each of one or more rules corresponding to each firewall interface in the target environment, and wherein said firewall emulator tool determines whether each transformed data flow is covered by the one or more rules for each firewall interface in the target environment.

7. The article of manufacture of claim 1, comprising generating a completeness report that indicates which of the transformed data flows are covered by a firewall configuration of one or more interfaces in the target environment and which of the transformed data flows are not covered by a firewall configuration of one or more interfaces in the target environment.

8. The article of manufacture of claim 1, comprising generating one or more recommendations for reconfiguring a firewall interface in the target environment.

9. A system for automatically determining configuration completeness during information technology (IT) transformation from a pre-transformation source environment to a post-transformation target environment, comprising:
    at least one distinct software module, each distinct software module being embodied on a tangible computer-readable medium;
    a memory; and
    at least one processor coupled to the memory and operative for:
        obtaining a record of each of multiple data flows from a source environment;
        transforming each of the multiple data flows in the source environment to multiple transformed data flows that correspond to a target environment, wherein said transforming comprises applying a mapping function to convert one or more parameters in each of the multiple data flows in the source environment into corresponding values that are relevant in the target environment;
        eliminating one or more of the multiple transformed data flows that are (i) accepted in the source environment and (ii) denied in the target environment to generate an intermediate collection of transformed data flows;
        adding one or more identified data flows to the intermediate collection of transformed data flows that are (i) denied in the source environment and (ii) permitted in the target environment to generate an enhanced collection of transformed data flows; and
        automatically determining that each of the transformed data flows in the enhanced collection of transformed data flows is covered by a firewall configuration of one or more interfaces in the target environment.

10. A method for automatically determining configuration completeness during information technology (IT) transformation from a pre-transformation source environment to a post-transformation target environment, the method comprising:
    obtaining a record of each of multiple data flows from a source environment;
    transforming each of the multiple data flows in the source environment to multiple transformed data flows that correspond to a target environment, wherein said transforming comprises applying a mapping function to convert one or more parameters in each of the multiple data flows in the source environment into corresponding values that are relevant in the target environment;

eliminating one or more of the multiple transformed data flows that are (i) accepted in the source environment and (ii) denied in the target environment to generate an intermediate collection of transformed data flows;

adding one or more identified data flows to the intermediate collection of transformed data flows that are (i) denied in the source environment and (ii) permitted in the target environment to generate an enhanced collection of transformed data flows; and automatically determining that each of the transformed data flows in the enhanced collection of transformed data flows is covered by a firewall configuration of one or more interfaces in the target environment;

wherein at least one of the steps is carried out by a computer device.

11. The method of claim 10, wherein said record comprises a log and/or a report of flows in the source environment.

12. The method of claim 10, wherein said obtaining a record of each of multiple data flows in a source environment comprises obtaining a record of each data flow that was observed to be accepted or denied in the source environment.

13. The method of claim 10, comprising dividing the transformed data flows into one or more sets, wherein each set corresponds to one interface of a network device in the target environment.

14. The method of claim 13, comprising using a classifier component on input of the transformed data flows and a zone inventory for the target environment, wherein the zone inventory includes information about a list of firewall interfaces in the target environment, corresponding internet protocol addresses, and the security zone structure of the target environment.

15. The method of claim 10, wherein said automatically determining comprises utilizing a firewall emulator tool, wherein said firewall emulator tool is configured with each of one or more rules corresponding to each firewall interface in the target environment, and wherein said firewall emulator tool determines whether each transformed data flow is covered by the one or more rules for each firewall interface in the target environment.

16. The method of claim 10, comprising generating a completeness report that indicates which of the transformed data flows are covered by a firewall configuration of one or more interfaces in the target environment and which of the transformed data flows are not covered by a firewall configuration of one or more interfaces in the target environment.

17. The method of claim 10, comprising generating one or more recommendations for reconfiguring a firewall interface in the target environment.

* * * * *